United States Patent

Dietrick

[11] 3,864,266
[45] Feb. 4, 1975

[54] FILTER SYSTEM

[76] Inventor: Gerald P. Dietrick, 523 Ridgeview Dr., Florence, Ky. 41042

[22] Filed: May 11, 1973

[21] Appl. No.: 359,310

[52] U.S. Cl.................. 210/329, 210/332, 210/387
[51] Int. Cl............................................ B01d 29/02
[58] Field of Search ........... 210/106, 108, 196, 253, 210/258, 333, 334, 324, 387, 400, 401, 329, 332

[56] References Cited
UNITED STATES PATENTS

| | | | |
|---|---|---|---|
| 3,172,846 | 3/1965 | Hirs | 210/108 X |
| 3,335,862 | 8/1967 | Hirs | 210/387 X |
| 3,478,879 | 11/1969 | Hirs | 210/387 X |
| 3,489,679 | 1/1970 | Davidson et al. | 210/387 X |
| 3,618,772 | 11/1971 | Dietrick | 210/387 X |
| 3,672,507 | 6/1972 | Paull, Jr. | 210/387 X |

*Primary Examiner*—John Adee
*Attorney, Agent, or Firm*—James W. Pearce; Roy F. Schaeperklaus

[57] ABSTRACT

A filter system including a filter strip and hollow upper and lower shells which form an enclosure surrounding a section of the filter strip. A liquid storage tank is connected to the upper shell to supply liquid. An outlet conduit connects the lower shell to an enclosed prime tank. An upright weir divides the prime tank into two sections. The outlet conduit discharges into one of the sections. A prime tank discharge line connects the other section to a pump which draws liquid from the prime tank. A jet ejector is connected to an upper portion of the prime tank. Liquid is discharged by the pump through the jet ejector to remove any entrained air that may accumulate in the upper portion of the prime tank.

5 Claims, 3 Drawing Figures

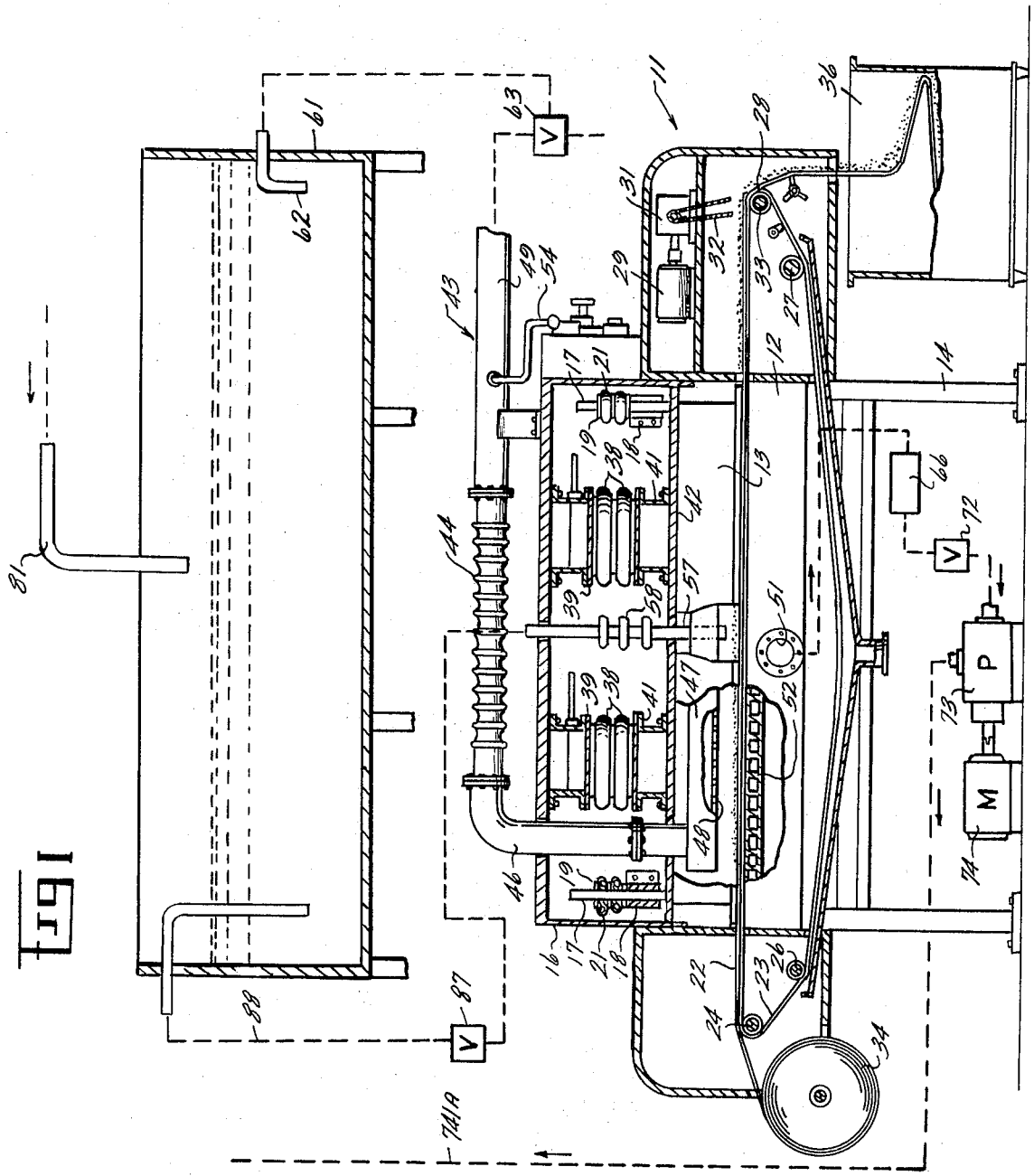

FILTER SYSTEM

This invention relates to a vacuum filtering system.

An object of this invention is to provide a filtering system using a flat bed filter in which only filtered liquid passes through a pump which draws a vacuum on the flat bed filter.

A further object of this invention is to provide such a system in which there is continuous filtering and in which when one of a pair of flat bed filters requires renewal of the filter medium, the second of the pair automatically continues the filtering.

Briefly, this invention provides a filtering system which includes a flat bed filter through which dirty liquid is drawn by a pump. Liquid from the flat bed filter passes through a prime tank before it reachs the pump. The prime tank includes a weir over which the liquid flows. The pump discharges liquid through a jet pump which is connected to the prime tank to draw any air from the prime tank which enters the prime tank during changing of the filter medium. When during use the pressure across the filter increases to a predetermined value and the filter medium requires changing, connections to the filter are closed and the liquid contents of the filter are discharged by action of compressed air or the like. Then the filter can be opened and the filter medium can be changed while a second similar filter is set in operation.

The above and other features and objects of the invention will be apparent to those skilled in the art to which this invention pertains from the following detailed description and the drawings, in which:

FIG. 1 is a view partly in upright section and partly schematic showing a filter and a filter system constructed in accordance with an embodiment of this invention together with connections thereto;

In the following detailed description and the drawings, like reference characters indicate like parts.

Figure 3:
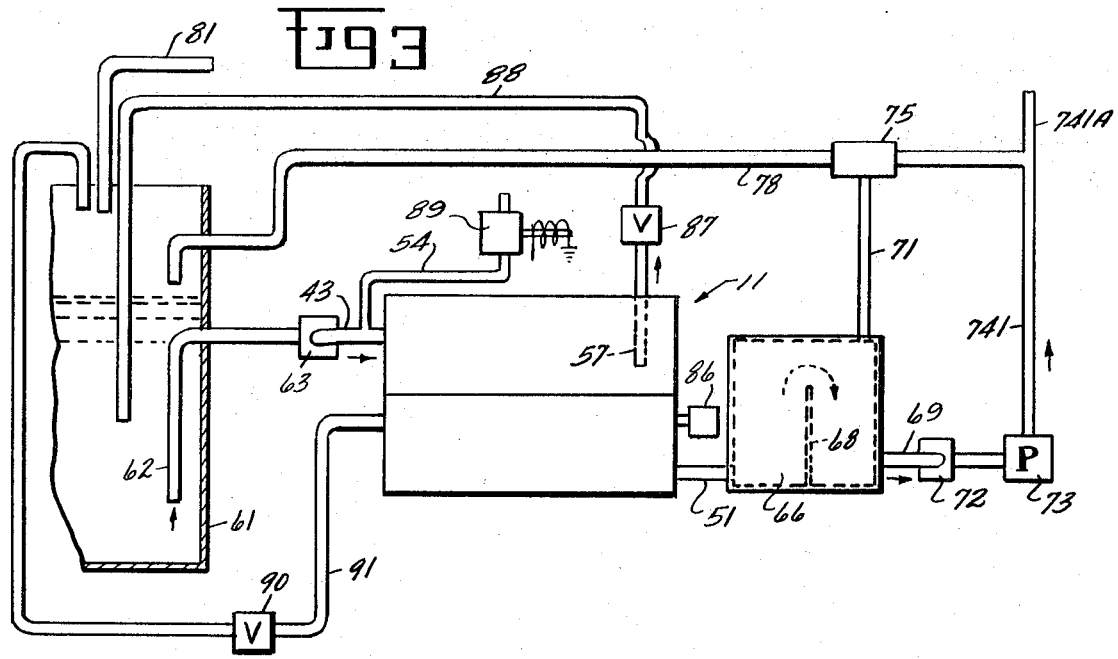
FIG. 3 is a schematic view in side elevation of the system.

In FIG. 1 is shown a flat bed filter 11, which is a part of a filter system constructed in accordance with an embodiment of this invention. The filter 11 can be of a generally usual structure and includes a lower hollow stationary shell 12 and an upper movable hollow shell 13. The lower shell is supported on legs 14. An upper stationary frame 16 is supported above the shells 12 and 13. The upper shell 13 carries upright bars 17. Stationary guides 18 mounted on the upper frame 16 guide the upright bars 17. The upright bars 17 are connected to rings 19 supported by expandable bags 21. When air under pressure is introduced into the bags 21 to expand the bags 21, the upper shell 13 is raised to free a strip of filter medium 22. The strip 22 is supported on a continuous belt 23 which runs on idle rolls 24, 26, and 27 and on a drive roll 28. A motor 29 drives gearing (not shown) in a gear box 31 to drive a chain 32. The chain 32 runs on a sprocket (not shown) carried by a shaft 33 on which the drive roll 28 is mounted. The filter medium is supplied by a roll 34. Used filter medium falls into a container 36. When a fresh section of the filter medium has been indexed into place between the lower shell 12 and the upper shell 13, the air pressure in the bags 21 is released and air under pressure is introduced into expandable bags 38. The bags 38 bear on stationary back-up members 39 mounted on the upper frame 16 and on movable back-up members 41 carried by an upper plate 42 of the upper shell 13. The bags 38 urge the upper shell downwardly to grip the filter medium strip firmly between edges of the shells 12 and 13. Dirty liquid is introduced into the upper shell 13 through an inlet conduit 43. The conduit 43 includes a flexible section 44 to permit movement of an inner end portion 46 thereof with the upper shell 13. The conduit 43 discharges into the interior of the upper shell 13 through a header 47 having a perforated lower plate 48 which distributes the dirty liquid throughout the upper shell 13. An outer end portion 49 of the conduit 43 is attached to the upper frame 16. Filtered liquid is withdrawn from the lower shell 12 through an outlet 51 which communicates with the interior of the lower shell 12. A perforated grid 52 mounted inside the lower shell 12 underlies and supports the belt 23 and the filter medium strip 22. The flat bed filter structure described to this point can be of known type.

An air line 54 is connected to the inlet conduit 43 so that air under pressure can be introduced therethrough. A diverter valve 63 is provided in the conduit 43 outboard of the air line 54. An upper shell discharge line 57 is mounted in the upper shell 13 with an inner end thereof extending downwardly to adjacent the filter medium strip 22. The line 57 includes a flexible section 58 to permit upward movement of the lower section thereof with the upper shell 13.

Figure 2:
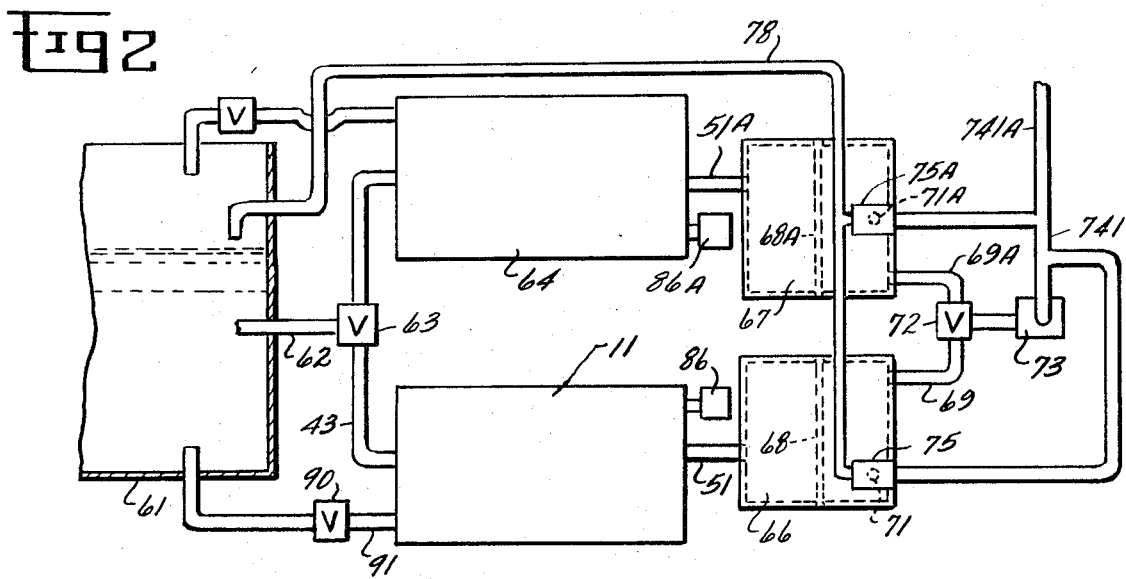
FIG. 2 is a schematic plan view of the filter system.

The filter 11 is shown in association with a tank 61 from which dirty liquid can be withdrawn through a dip tube 62 which is connected to the conduit 43 through the diverter valve 63. As shown in FIG. 2, the diverter valve 63 can direct dirty liquid from the tank 61 either to the filter 11 or a second flat bed filter 64, which can be similar in construction to the filter already described. The discharge line 51 of the filter 11 is connected to a prime tank 66. A discharge line 51A of the filter 64 is connected to a prime tank 67. The prime tank 66 is an enclosed hollow tank provided with an upright centrally located weir 68. Liquid enters the prime tank 66 through the line 51 at a level below the upper edge of the weir 68 and on one side of the weir 68. The liquid is withdrawn through a line 69 which communicates with the interior of the prime tank 66 on the other side of and below the upper edge of the weir 68. A suction line 71 is attached to the upper portion of the prime tank 66 above the upper level of the weir 68. Liquid from the line 69 passes through a diverter valve 72 to a pump 73 driven by a motor 74 (FIG. 1) which directs some of the liquid through a pressure line 741 and through a jet ejector 75 (FIGS. 2 and 3) connected to the suction line 71 to draw air from the upper portion of the prime tank 66. The prime tank 67 can be similar in construction and includes a weir 68A, a suction line 71A and a discharge line 69A. The discharge line 69A is connected to the valve 72, and the pump 73 can withdraw liquid either from the prime tank 66 or the prime tank 67. The pressure line 741 from the pump 73 is connected to a jet ejector 75A, which is connected to the suction line 71A to withdraw air from the second prime tank 67. The jet ejectors 75 and 75A discharge through a line 78 into the tank 61.

The tank 61 is shown in association with a line 81 (FIG. 1) from which dirty coolant is received from a machining system (not shown in detail).

When the system is in operation with the filter 11 ready to receive liquid, liquid is discharged from the pump 73 through the line 741 and a branch 741A thereof which delivers the liquid to the machining system. Dirty liquid is withdrawn from the tank 61 through the dip tube 62 and is directed through the conduit 43 and the header 47 into the upper shell 13 to be filtered through the filter medium strip 22 and to be discharged through the discharge line 51, the prime tank 66, and the discharge line 69 (FIG. 3) to the pump 73. As the filter cake builds up on the filter medium strip 22, the pressure below the filter strip is decreased until the cake reaches a predetermined thickness and supplies a predetermined resistance to flow of liquid therethrough and a predetermined reduced pressure is developed below the filter strip. The pressure is recorded by a gauge 86 connected to the lower shell (FIG. 3). When the gauge registers the predetermined reduced pressure, as a vacuum of approximately 16 inches of mercury, the diverter valves 63 and 72 are turned to their alternate positions at which liquid is directed through the filter 64. A valve 87 is opened and a valve 90 is opened. The valve 87 is in the line 57. An outer portion 88 of the line 57 is directed to discharge into the dirty liquid storage tank 61, as shown in FIGS. 1 and 3. An air valve 89 (FIG. 3) is opened so that air under pressure is directed through the air line 54 to force liquid in the upper shell 13 through the filter medium strip 22 or through the upper shell discharge line 57 to be discharged into the dirty liquid storage tank 61. The valve 90 communicates with the interior of the lower shell through a line 91 (FIG. 3). The valve 90 allows filtered liquid to pass through the line 91 to the tank 61 to allow complete evacuation of the lower shell and to allow air drying of the filter cake. After a predetermined time, the valve 87 is closed, and the air continues to force any remaining liquid through the filter cake and the filter medium strip 22. After a further predetermined time, the air valve 89 (FIG. 3) is closed and the valve 87 is again opened to release the pressure in the upper shell 13 (FIG. 1). The valve 90 is closed to prevent back flow of dirty liquid. The pressure in the bags 38 is released and air under pressure is directed into the bags 21 to raise the upper shell and release the filter medium strip 22. When the upper shell has been raised, the filter medium strip 22 is indexed to the right as shown in FIG. 1 to provide a fresh portion of filter medium. Then the pressure in the bags 21 is released and air under pressure is introduced into the bags 38 to close the upper shell, and the filter 11 is ready to be set in operation when a pressure gauge 86A communicating with the lower shell of the filter 64 (FIG. 2) indicates that the filter 64 is ready for a change of medium. When the filter 11 has been closed, the valve 87 is opened so that liquid can enter the upper shell 13 through the line 88 and the valve 87. The jet ejectors 75 and 75A continuously draw air or liquid from the upper portions of the prime tanks 66 and 67 so that the prime tanks are filled with liquid as soon as liquid starts to flow therethrough. The valve 87 remains open until the filter 11 shifts to filter cycle, whereupon the valve 87 is closed.

The filter system described above and illustrated in the drawings is subject to structural modification without departing from the spirit and scope of the appended claims.

Having described my invention, what I claim as new and desire to secure by letters patent is:

1. In combination with a pair of filters each including a filter strip and hollow upper and lower shells for forming an enclosure surrounding a section of the filter strip, a liquid storage tank, inlet conduit means connecting the tank alternately to the upper shells to supply liquid to the upper shells, an outlet conduit connected to each lower shell, a pair of enclosed prime tanks, there being an upright weir in each prime tank dividing the prime tank into two sections, each outlet conduit discharging into one of the sections of one of the prime tanks, a prime tank discharge line, means for alternately connecting the prime tank discharge line to the other section of each prime tank below an upper edge of the weir, a pump connected to the prime tank discharge line to draw liquid from the prime tanks, a jet ejector connected to an upper portion of each prime tank, and means for directing liquid from the pump through the ejectors to power the ejectors to draw fluid from the upper portions of the prime tanks.

2. A combination as in claim 1 wherein each outlet conduit discharges into the associated prime tank below the upper edge of the weir.

3. A combination as in claim 1 wherein the jet ejector discharges into the liquid storage tank.

4. A combination as in claim 1 wherein there is means for directing air under pressure into the upper shell of each filter to cause discharge of liquid from the upper shell.

5. A combination as in claim 4 wherein there is means for directing liquid from the upper shell of each filter to the liquid storage tank when air is directed into the upper shell.

* * * * *